(12) United States Patent  (10) Patent No.: US 8,335,407 B2
Yokoi  (45) Date of Patent: Dec. 18, 2012

(54) METHOD FOR MANUFACTURING OPTICAL NONRECIPROCAL ELEMENT

(75) Inventor: Hideki Yokoi, Tokyo (JP)

(73) Assignee: Shibaura Institute of Technology, Koto-Ku, Tokyo (JP)

( * ) Notice: Subject to any disclaimer, the term of this patent is extended or adjusted under 35 U.S.C. 154(b) by 99 days.

(21) Appl. No.: 12/665,635

(22) PCT Filed: Feb. 25, 2008

(86) PCT No.: PCT/JP2008/053214
§ 371 (c)(1),
(2), (4) Date: Apr. 5, 2010

(87) PCT Pub. No.: WO2009/107194
PCT Pub. Date: Sep. 3, 2009

(65) Prior Publication Data
US 2010/0307678 A1    Dec. 9, 2010

(51) Int. Cl.
*G02B 6/12* (2006.01)
(52) U.S. Cl. .......................................................... 385/14
(58) Field of Classification Search ...................... 385/14
See application file for complete search history.

(56) References Cited

U.S. PATENT DOCUMENTS

| | | |
|---|---|---|
| 6,943,932 B2 | 9/2005 | Fujita et al. |
| 7,826,690 B2 | 11/2010 | Nakajima et al. |
| 7,995,893 B2 | 8/2011 | Bi et al. |

FOREIGN PATENT DOCUMENTS

| | | |
|---|---|---|
| JP | 07-043654 | 2/1995 |
| JP | 07-318876 | 12/1995 |
| JP | 08-068965 | 3/1996 |
| JP | 2000-338450 | 12/2000 |
| JP | 2001-350039 | 12/2001 |
| JP | 2003-302603 | 10/2003 |
| JP | 2004-240003 | 8/2004 |
| JP | 2006-349778 | 12/2006 |
| JP | 2006349778 A * | 12/2006 |
| JP | 2007-219285 | 8/2007 |
| WO | WO-2007/094515 | 8/2007 |

OTHER PUBLICATIONS

U.S. Appl. No. 12/665,435, filed Dec. 18, 2009, Yokoi.

(Continued)

*Primary Examiner* — Sung Pak
(74) *Attorney, Agent, or Firm* — Foley & Lardner LLP

(57) ABSTRACT

A novel technique is provided, which can secure sufficient adhesion of an Si layer and a magneto-optical material layer while avoiding occurrence of cracks when fabricating an optical nonreciprocal element by bonding the Si layer on which a rib waveguide is formed, and the magneto-optical material layer. The method includes forming a waveguide on the Si layer of an SOI substrate which is a first substrate, forming a first thin-film buffer layer on the aforesaid waveguide, forming a second thin-film buffer layer on an magneto-optical material layer deposited on a second substrate by using a same material as that of the aforesaid first thin-film buffer layer, and bonding the aforesaid first thin-film buffer layer and the aforesaid second thin-film buffer layer in placement where a light propagating in the aforesaid waveguide can be caused to generate nonreciprocal phase change by the aforesaid magneto-optical material layer.

20 Claims, 6 Drawing Sheets

OTHER PUBLICATIONS

Shintaku, T. et al., "Directional Coupler Type Optical Circulator," *Transactions of the IEICE*, vol. E73, No. 4, Apr. 1990, pp. 474-476.

Yokoi, H. et al., "Magnetooptic Waveguide with $SiO_2$ Cladding Layer Integrated on InP Substrate by Wafer Direct Bonding," *Jpn. J. Appl. Phys.*, vol. 36, 1997, pp. 7230-7232.

Yokoi, H. et al., "Optical nonreciprocal devices with a silicon guiding layer fabricated by wafer bonding," *Applied Optics*, vol. 42, No. 33, Nov. 20, 2003, pp. 6605-6612.

Yokoi, H. et al., "Optical nonreciprocal devices with Si guiding layer," *Technical Report of IEICE*, vol. 103, No. 667, Feb. 2004, pp. 17-22 (with English abstract).

Yokoi, H. et al., "Analysis of the effect of nonreciprocal phase shift on magneto-optical waveguide having Si guiding layer," *Proceedings of the 2005 IEICE Society Conference*, Sep. 20, 2005, pp. 216 (with English translation).

Zhuang, X. et al., "An Analysis of Nonreciprocal Phase Characteristics of Magneto-Optic Channel Waveguides Using Finite-Element Method," *Technical Report of Institute of Electronics, Information, and Communication Engineers*, vol. J76-C-I, No. 2, Feb. 1993, pp. 41-47 (with English translation).

Notice of Reasons for Rejection for JP 2009-529451 mailed Jan. 5, 2010 (with English translation).

International Search Report for PCT/JP2008/053214 mailed Mar. 25, 2008 (with English translation).

International Search Report for PCT/JP2008/065331 mailed Sep. 30, 2008 (with English translation).

Yokoi, H. et al., "Calculation of Nonreciprocal Phase Shift in Magnetooptic Waveguide with Si Guiding Layer," Japanese Journal of Applied Physics, vol. 43, No. 8B, 2004, pp. 5871-5874.

Decision of Rejection for JP 2009-529451 mailed Apr. 14, 2010 (with English translation).

Yokoi, H. et al., "Optical nonreciprocal devices with Si guiding layer," Technical Report of IEICE, vol. 103, No. 667, Feb. 2004, pp. 17-22 (with full English translation—*previously submitted with English abstract only*).

Notice of Reasons for Rejection for JP 2009-529454 mailed Oct. 5, 2009 (with English translation).

Notice of Reasons for Rejection for JP 2009-529451 mailed Oct. 14, 2009 (with English translation).

Japanese Inquiry issued for Japanese Patent Appl. No. 2009-529451 mailed Feb. 16, 2011 (English translation not available).

Shintaku, T., "Integrated Optical Isolator Based on Efficient Nonreciprocal Radiation Mode Conversion," Applied Physics Letters, Oct. 5, 1998, vol. 73, No. 14, pp. 1946-1948.

Non-final Office Action received for U.S. Appl. No. 12/665,435 dated Feb. 1, 2012.

Amemiya, T., et al., "Semiconductor waveguide optical isolator based on nonreciprocal loss induced by ferromagnetic MnAs," *Applied Physics Letters*, 2006, vol. 89, Issue 2, 3 pages.

International Preliminary Report on Patentability for Intl. Pat. Appln. No. PCT/JP2008/053214 (including English Translation) issued on Aug. 31, 2010, 11 pages.

International Preliminary Report on Patentability for Intl. Pat. Appln. No. PCT/JP2008/065331 (including English translation), issued on Mar. 1, 2011, 8 pages.

Notice of Allowance for U.S. Appl. No. 12/665,435, mailed on Jun. 22, 2012, 10 pp.

Written Opinion of the International Search Authority for Intl. Pat. Appln. No. PCT/JP2008/053214 (including English translation), mailed on Mar. 25, 2008, 9 pp.

Written Opinion of the International Searching Authority for Intl. Pat. Appln. No. PCT/JP2008/065331 (including English translation), mailed on Sep. 30, 2008, 6 pages.

Yokoi, H., "Interferometric Optical Isolator with TiO2/Magnetic Garnet Waveguide Operated in Unidirectional Magnetic Field," *Japanese Journal of Applied Physics*, 2006, vol. 45, No. 6A, pp. 5076-5077.

* cited by examiner

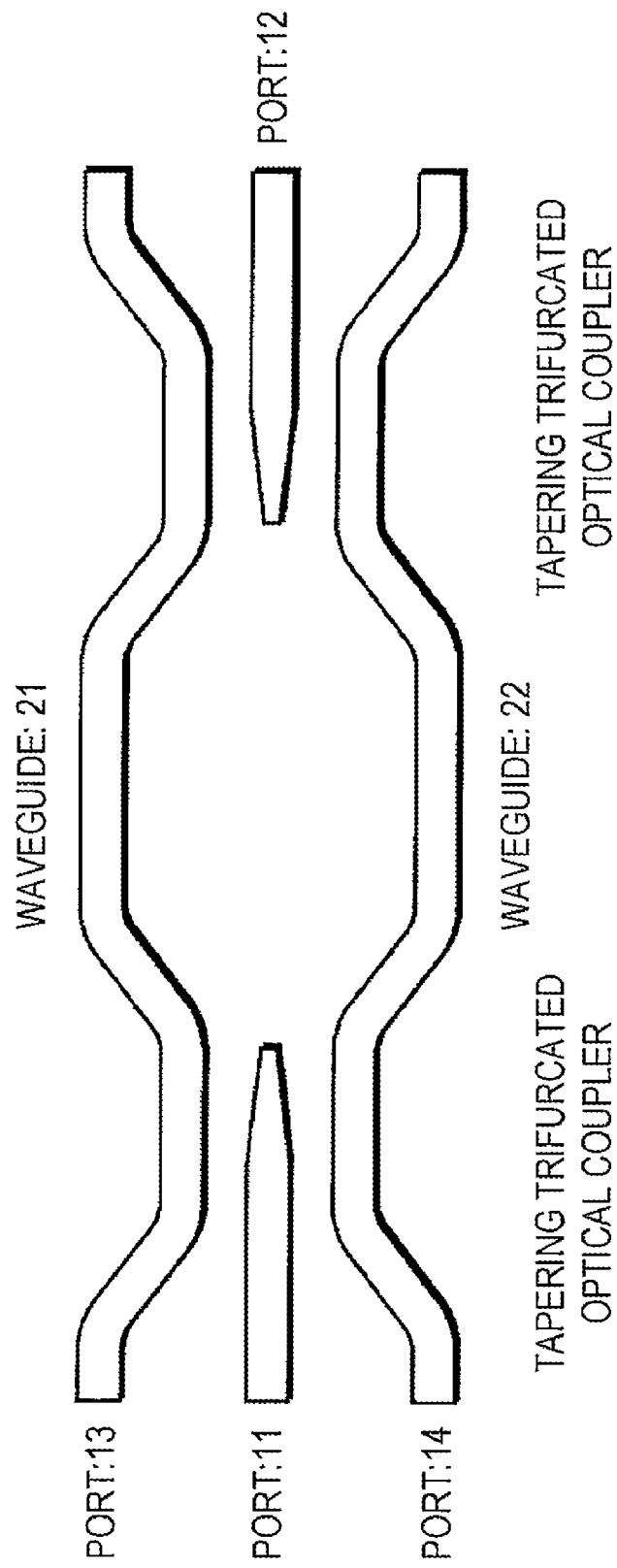

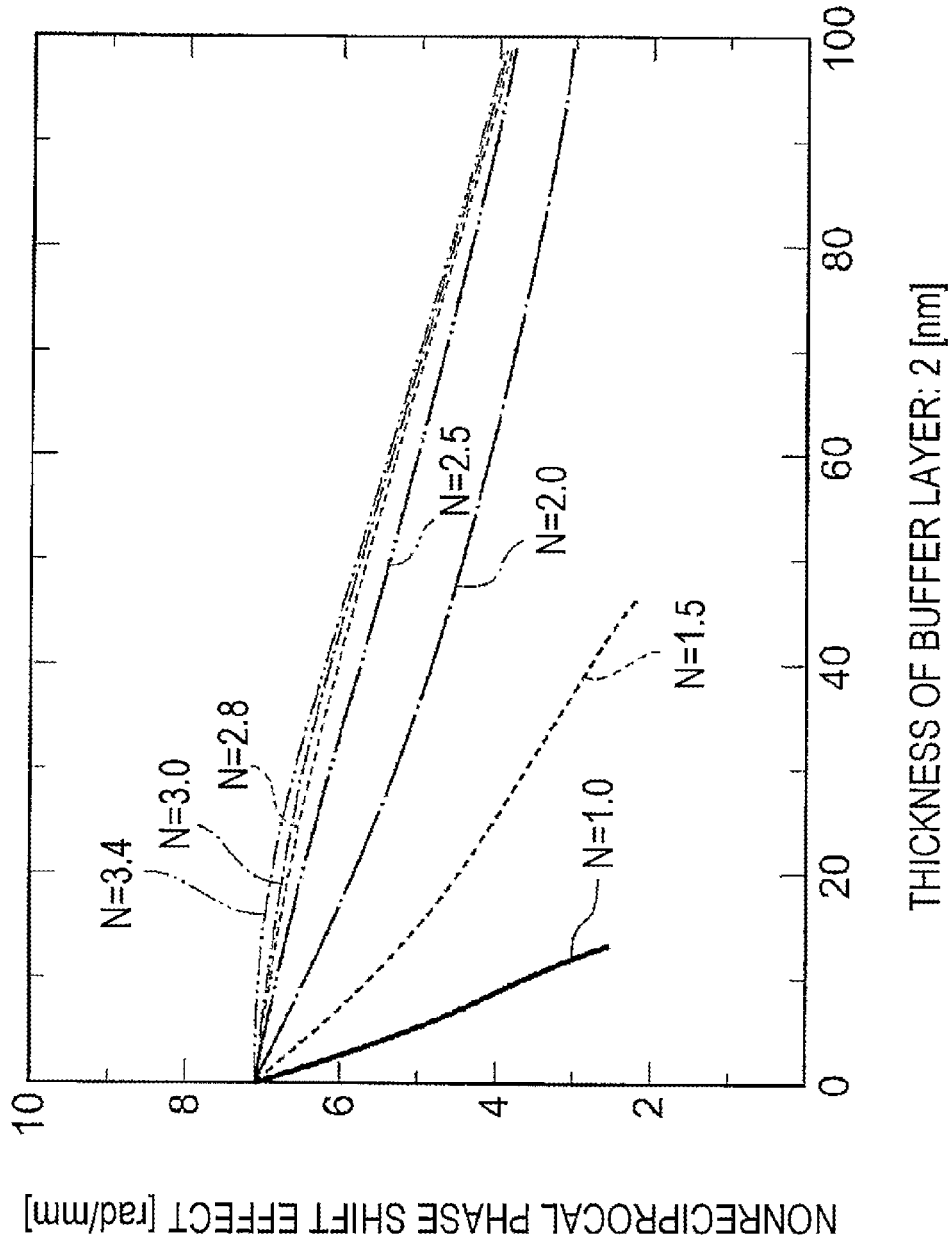

METHOD FOR MANUFACTURING OPTICAL NONRECIPROCAL ELEMENT

CROSS-REFERENCE TO RELATED PATENT APPLICATIONS

The present application claims priority as a national stage application of the International Application No. PCT/JP2008/053214 filed on Feb. 25, 2008, the entire contents of which are incorporate herein by reference in their entireties.

TECHNICAL FIELD

The present invention relates to a method for manufacturing an optical nonreciprocal element.

BACKGROUND ART

A method has been proposed for manufacturing a compact optical nonreciprocal element by forming a waveguide on an Si layer of an SOI substrate, and bonding a magneto-optical material layer, which causes a light propagating in the waveguide to generate a nonreciprocal phase change, onto the Si layer. For example, Non-Patent Document 1 discloses a method for manufacturing an optical nonreciprocal element by bonding magnetic garnet by direct bonding (wafer bonding) onto an Si waveguide layer on which a rib waveguide is formed.

[Non-Patent Document 1] Hideki Yokoi and two others, "Si Dohaso o Yusuru Hi Sohan Soshi", IEICE Technical Report, February 2004, Vol. 103, No. 667 (20040213), pp. 17-22

DISCLOSURE OF THE INVENTION

Problems to be Solved by the Invention

Wafer bonding usually forms hetero junction by application of heat treatment (for example, 800° C. to 900° C.) to a bonded substrate surface, and has the problem that a crack easily occurs to a substrate during cooling after heat treatment due to difference of the thermal expansion coefficients of the materials (for example, Si and magnetic garnet) which are subjected to hetero junction.

Against such a problem, a countermeasure is conceivable, which suppresses the occurrence of a crack by lowering the temperature at the time of heat treatment (for example, lowering the temperature to 220° C.) However, when a magneto-optical material layer is bonded on the Si layer on which a waveguide with recesses and projections is formed by wafer bonding, as the optical nonreciprocal element of Non-Patent Document 1, sufficient adhesion is difficult at a low temperature unlike the case of bonding flat materials by wafer bonding.

Thus, the present invention has an object to provide a novel technology of securing sufficient adhesion between an Si waveguide layer and a magneto-optical material layer while avoiding occurrence of a crack when manufacturing an optical nonreciprocal element by bonding the Si waveguide layer on which a waveguide is formed, and the magneto-optical material layer.

Means for Solving the Problems

A method for forming an optical nonreciprocal element of the present invention is characterized by including forming a waveguide on an Si layer of an SOI substrate which is a first substrate, forming a first thin-film buffer layer on the aforesaid waveguide, forming a second thin-film buffer layer on a magneto-optical material layer deposited on a second substrate by using a same material as that of the aforesaid first thin-film buffer layer, and bonding the aforesaid first thin-film buffer layer and the aforesaid second thin-film buffer layer in placement where a light propagating in the aforesaid waveguide can be caused to generate a nonreciprocal phase change by the aforesaid magneto-optical material layer.

Further, a method for manufacturing an optical nonreciprocal element of the present invention is characterized by including forming a first thin-film buffer layer on an Si layer of an SOI substrate which is a first substrate, processing the aforesaid Si layer and the aforesaid first thin-film buffer layer to form an Si waveguide with the aforesaid first thin-film buffer layer being stacked on an upper portion, forming a second thin-film buffer layer on a magneto-optical material layer deposited on a second substrate by using a same material as that of said first thin-film buffer layer, and bonding the aforesaid first thin-film buffer layer stacked on the upper portion of the aforesaid Si waveguide, and the aforesaid second thin-film buffer layer in placement where a light propagating in the aforesaid waveguide can be caused to generate nonreciprocal phase change by the aforesaid magneto-optical material layer.

Preferably, the aforesaid material forming the aforesaid first thin-film buffer layer and the aforesaid second thin-film buffer layer is a material having a refraction index which is 2.8 or higher, and lower than a refraction index of an Si waveguide layer.

Further, preferably, the method is characterized by further including magnetizing the aforesaid magneto-optical material layer in a vertical direction to a propagating direction of the light in the aforesaid waveguide.

Further, preferably, the method is characterized in that forming the aforesaid first thin-film buffer layer, and forming the aforesaid second thin-film buffer layer are carried out so that a total of a thickness of the aforesaid first thin-film buffer layer and a thickness of the aforesaid second thin-film buffer layer becomes 20 nm or less.

Further, preferably, the method is characterized in that forming the aforesaid second thin-film buffer layer is forming the aforesaid second thin-film buffer layer on a magnetic garnet layer deposited on the aforesaid second substrate.

ADVANTAGE OF THE INVENTION

As above, according to the present invention, when an optical nonreciprocal element is manufactured by bonding an Si waveguide layer on which a waveguide is formed and a magneto-optical material layer, sufficient adhesion of the Si waveguide layer and the magneto-optical material layer can be secured while occurrence of cracks is being avoided.

BEST MODE FOR CARRYING OUT THE INVENTION

Hereinafter, an embodiment of the present invention will be described with reference to the drawings.

FIG. 1 is a view showing an embodiment of the present invention, and shows a structure of an optical isolator using an optical nonreciprocal phase shift effect. FIG. 2 is a view showing a structure when cut along the A-A' line of FIG. 1.

As shown in FIGS. 1 and 2, an optical isolator 100 includes an Si waveguide layer 1 formed on an SOI substrate adopting an Si/SiO$_2$/Si layer structure, a buffer layer 2 arranged on the Si waveguide layer 1, and a magneto-optical material layer 3 arranged on the adhesive buffer layer 2. The $SiO_2$ layer of the SOI substrate has a thickness of about 2 μm or larger, and a refractive index of about 1.45, and functions as a lower clad layer.

The Si waveguide layer 1 is a waveguide layer formed on the surface Si layer (thickness of about 200 nm) of the SOI substrate. The Si waveguide layer 1 includes a rib waveguide 4, and its refractive index is about 3.5.

The buffer layer 2 is formed by joining a thin-film buffer layer 21 formed on the Si waveguide layer 1 side, and a thin-film buffer layer 22 formed on the magneto-optical material layer 3 side. The thin film buffer layer 21 and the thin-film buffer layer 22 are formed from the same material X. The material X may be any material if only it is the material which can deposit a thin film, such as amorphous silicon in addition to an oxide such as a titanium oxide, a nitride such as SiNx, a carbide such as a silicon carbide, and is not limited to an adhesive material, but it is desirable to select the one having a refractive index which is 2.8 or higher and lower than the refractive index of the Si waveguide layer, concretely, a refractive index in the range of 2.8 to 3.4 inclusive.

As shown in the drawings, in the optical isolator of the present embodiment, the thin-film buffer layer 21 is also formed on the surface where the rib waveguide 4 of the Si waveguide layer 1 is not formed.

The magneto-optical material layer 3 is formed from the magneto-optical material such as a rare-earth magnetic garnet (hereinafter, called "magnetic garnet") expressed by a composition formula of $R_3Fe_5O_{12}$ (R represents a rare-earth element), and functions as an upper clad layer.

The magneto-optical material layer 3 is magnetized in the vertical direction to the propagating direction of the light in the rib waveguide 4 in the film surface so as to cause a light propagating in the rib waveguide to cause a nonreciprocal phase change. In the example shown in FIG. 1, in the portions corresponding to two waveguides (waveguides 21 and 22 of FIG. 3), the magneto-optical material layer 3 is magnetized so that the directions of magnetization are in the opposite directions. The magneto-optical material layer 3 may be designed to be magnetized in advance, or as shown in FIGS. 1 and 2, magnetic field applying unit 5 (a pair of compact permanent magnets or the like) which applies a magnetic field from an outside so as to align the direction of magnetization of the magneto-optical material layer 3 with the direction vertical to the propagating direction of a light may be provided on the magneto-optical material layer 3.

Next, with reference to FIG. 3 schematically showing the rib waveguide 4, the operation principle of the optical isolator 100 of the present embodiment will be described.

The optical isolator 100 is configured by a Mach-Zender interferometer which multiplexes and demultiplexes waves by two tapering trifurcated optical couplers, has two waveguides 21 and 22 between the two tapering trifurcated optical couplers, and includes a reciprocal phase shifter of 90° and a nonreciprocal phase shifter of 90°. The tapering trifurcated optical coupler may be an optical branching/coupling device which is a so-called Y branch.

The nonreciprocal phase shifter is realized by a layer structure of a magneto-optical material/Si/$SiO_2$. In such a structure, magnetization of the magneto-optical material layer 3 is oriented within the film surface and vertically in the propagating direction of a light, whereby a nonreciprocal phase shift effect occurs to a propagating TM mode light.

The nonreciprocal phase shifter is designed so that the difference of nonreciprocal phase changes in the two waveguides 21 and 22 in the interferometer becomes 90° in the forward direction (−90° in the reverse direction). Such a design can be realized by adjusting the refractive indexes of the Si waveguide layer 1, the buffer layer 2 and the magneto-optical material layer 3, the direction of magnetization applied to each of the waveguides, propagation length in which the light wave receives the magneto-optical effect and the like.

Meanwhile, the reciprocal phase shifter is realized by the optical path difference of the two waveguides in the interferometer, and is designed so that the reciprocal phase changes in the two waveguides 21 and 22 in the interferometer becomes −90°.

The TM mode light which is incident on a port 11 is branched into light waves of the same amplitude and the same phase by the tapering trifurcated optical coupler at the input end side, and the respective light waves propagate in the forward direction in the waveguides 21 and 22 respectively. The difference of the phase changes of 90° occurs to the light waves which propagate in the forward direction in the waveguide 21 and the waveguide 22 due to the nonreciprocal phase shift effect, but such a difference is cancelled out by the reciprocal phase shift effect of the same amount. As a result, the light waves propagating in the forward direction in the waveguides 21 and 22 are incident on the tapering trifurcated optical coupler at the output end side with the same amplitude and the same phase, and are coupled to a port 12 and is outputted.

Meanwhile, the TM mode light incident on the port 12 is branched into the light waves of the same amplitude and the same phase by the tapering trifurcated optical coupler at the output end side, and each of the light waves propagates in the reverse direction in the waveguide 21 and the waveguide 22. The difference of the phase changes of −90° occurs to the light waves which propagate in the reverse direction in the waveguide 21 and the waveguide 22 by the nonreciprocal phase shift effect, and further, the difference of the phase changes of −90° by the reciprocal phase shift effect is added. As a result, the light waves propagating in the reverse direction in the waveguide 21 and waveguide 22 are incident on the input end side tapering trifurcated optical coupler with the same amplitude and a phase difference of 180°. In this case, due to the characteristics which the tapering trifurcated optical coupler has, each of the light waves is coupled to ports 13 and 14 instead of the port 11, and is outputted.

As above, the TM mode light which enters from the port 11 is outputted from the port 12, but the TM mode light which enters from the port 12 is not outputted from the port 11, and therefore, an isolator operation is obtained between the port 11 and the port 12.

Next, a manufacturing process for obtaining the structure as shown in FIGS. 1 and 2 will be described.

First, a waveguide pattern is transferred onto the surface Si layer of the SOI substrate by photolithography, the rib waveguide 4 is formed by etching, and the Si waveguide layer 1 is formed. Various prior arts can be used for photolithography and etching.

Next, the thin-film buffer layer 21 is formed on the Si waveguide layer 1 including the rib waveguide 4 by using the material X. For the forming method, the conventional thin-film forming techniques such as spin coat and spraying can be used.

Next, the magneto-optical material layer 2 is deposited on the substrate corresponding to the magneto-optical material by crystal growth. For example, when a rare earth magnetic garnet (hereinafter, called "magnetic garnet") expressed by a composition formula of $R_3Fe_5O_{12}$ (R represents a rare earth element) is used as the magneto-optical material, the flat magnetic garnet layer 2 can be deposited on the single crystal substrate formed from garnet by liquid phase epitaxy. In FIGS. 1 and 2, this substrate is omitted.

Next, the thin-film buffer layer 22 is formed on the magneto-optical material layer 3 by using the material X. As the forming method, the conventional thin-film forming techniques such as spin coat and spraying can be used.

Depositing the magneto-optical material layer 3 and forming the thin-film buffer layer 22 may be performed before forming the Si waveguide layer 1 and forming the thin-film buffer layer 21.

Next, the thin-film buffer layer 21 formed on the rib waveguide 4 and the thin-film buffer layer 22 are joined (bonded by wafer bonding) in the placement in which the light propagating in the rib waveguide 4 can be caused to generate a nonreciprocal phase change by the magneto-optical material layer 3, in concrete, in the placement in which the magneto-optical material layer 3 corresponds to the entire rib waveguide 4. At the time of joining, heat treatment (for example, 800° C. to 900° C.) may be applied, or pressurization may be performed. Thereby, the buffer layer 2 is formed by the thin-film buffer layer 21 formed on the rib waveguide 4 and the thin-film buffer layer 22.

As described above, the magneto-optical material layer 3 is magnetized so as to cause the light propagating in the rib waveguide 4 to generate a nonreciprocal phase change. For this purpose, magnetizing the magneto-optical material layer 3 in the vertical direction with respect to the propagating direction of the light in the rib waveguide 4 by providing the magnetic field applying unit 5 on the magneto-optical material layer 3 as shown in FIG. 1, for example, may be carried out before or after joining.

Here, when the space between the Si waveguide layer 1 (rib waveguide 4) and the magneto-optical material layer 3 increases due to the presence of the buffer layer 2, the ratio of the evanescent wave effusing to the magneto-optical material layer 3 reduces, and the nonreciprocal phase shift effect (magneto-optical effect) reduces.

Thus, the inventor of the present invention studied the conditions for suppressing reduction in the nonreciprocal phase shift effect due to the presence of the buffer layer 2.

First, in order to confine a light wave within the rib waveguide 4, the refractive index N of the buffer layer 2 needs to be lower than the refractive index of the Si waveguide layer 1. Thus, the relationship of the amount of the nonreciprocal phase shift effect [rad/mm], the thickness of the buffer layer 2 (more specifically, the space between the Si waveguide layer 1 (rib waveguide 4) and the magneto-optical material layer 3) [nm] was analyzed with respect to the refractive index N of the buffer layer 2 in the range lower than the refractive index of the Si waveguide layer 1.

FIG. 4 shows the relationship obtained by the analysis. As is understood from FIG. 4, when the refractive index N of the buffer layer 2 is in a high range of 2.8 to 3.4, the nonreciprocal phase shift effect shows the tendency of gradually decreasing in substantially the same manner with respect to the increase in the thickness of the buffer layer 2. It is found out that especially when the refractive index N of the buffer layer 2 is in the range of 2.8 to 3.4, and the thickness of the buffer layer 2 is 20 nm or less, decrease in the nonreciprocal phase shift effect hardly occurs.

Based on such analysis, in the present embodiment, as the material X for forming the buffer layer 2, the material having a refractive index which is 2.8 or larger and lower than the refractive index of the Si waveguide layer 1 (preferably the refractive index in the range of 2.8 to 3.4) is selected. Further, forming the thin-film buffer layer 21 and forming the thin-film buffer layer 22 are carried out so that the thickness of the buffer layer 2 (total of the thickness of the thin-film buffer layer 21 and the thickness of the thin-film buffer layer 22) becomes 20 nm or less.

Thus, in the present embodiment, the buffer layer is formed by joining the thin-film buffer layers formed from the same material, and the optical isolator 100 is manufactured. Therefore, when the thin-film buffer layers are joined by performing high-temperature heat treatment, cracks due to the difference of the thermal expansion coefficients of the materials (for example, Si and magnetic garnet) subjected to hetero junction, which are conventionally likely to occur can be avoided, and the Si waveguide layer 1, the buffer layer 2 and the magneto-optical material layer 3 can be firmly bonded with high repeatability. Further, the buffer layer 2 of the present embodiment has the refractive index which is 2.8 or higher and lower than the refractive index of the Si waveguide layer 1, and therefore, decrease in the nonreciprocal phase shift effect can be suppressed, and the operation of the optical isolator 100 is not practically influenced.

Modified Example

The present invention can be applied by being variously modified without being limited to the above described embodiment. For example, as the placement in which the light propagating in the rib waveguide 4 can be caused to generate a nonreciprocal phase change, the above described embodiment adopts the configuration in which the magneto-optical material layer 3 is formed in only the central area of the rib waveguide 4, but the magneto-optical material layer 3 may be formed to cover the entire rib waveguide 4.

Further, in the above described embodiment, the nonreciprocal phase shifter is designed so that the difference of the nonreciprocal phase changes in the two waveguides becomes 90° in the forward direction (−90° in the reverse direction), and the reciprocal phase shifter is designed so that the difference becomes −90°, but these signs may be opposite.

Further, in the above described embodiment, as the example of an optical nonreciprocal element, the optical isolator is described, but the present invention is not limited to optical isolators. For example, if in the optical isolator 100 of FIG. 1, two tapering trifurcated optical couplers are replaced with directional couplers, an optical circulator using the nonreciprocal phase shift effect can be configured. The operation principle thereof is the same as the optical isolators. More specifically, in the forward direction, the nonreciprocal phase shift effect and the reciprocal phase shift effect cancel out each other, and in the reverse direction, they are added up, whereby the optical circulator operation is realized.

Further, the method of the present invention is not limited to the manufacture of the optical isolator of the configuration as the above described embodiment. For example, by the method of the present invention (the method for forming a buffer layer by forming thin-film buffer layers from the same material on both of the Si waveguide layer side and the magneto-optical material layer side, and joining these thin-film buffer layers), an optical isolator including an Si waveguide layer having a linear rib waveguide and using a nonreciprocal waveguide mode-radiation mode conversion as shown in FIG. 5A may be manufactured. The optical isolator shown in FIG. 5A includes a nonreciprocal phase device of the layer structure of the magneto-optical material magnetized vertically to the light propagating direction and in the direction at a predetermined angle with respect to the film surface/Si/SiO$_2$, and thereby, causes the TM mode light propagating in the rib waveguide to generate a nonreciprocal phase effect. When the propagation constants of the TM mode lights propagating in the forward direction and the reverse direction are expressed by $\beta_{11f}$ and $\beta_{11b}$, respectively, and the cutoff of the TE mode is expressed by $\beta c$, the optical isolator can be designed so as to satisfy the relationship of $\beta_{11b} < \beta c < \beta_{11f}$ by adjusting the waveguide parameters (the height of the rib, rib width and the like). When this relationship is satisfied, only the TM mode light propagating in the reverse direction is coupled with the TE radiation mode light, and therefore, the optical isolator can be caused to function as a TM mode operation optical isolator.

Further, for example, by the method of the present invention, a TE-TM mode conversion type optical isolator having a linear Si waveguide layer as shown in FIG. 5B may be manufactured. The optical isolator shown in FIG. 5B includes a nonreciprocal TE-TM mode convertor which is realized by a layer structure of a magneto-optical material magnetized in a light propagating direction/Si/SiO$_2$, and a reciprocal TE-TM mode convertor which is realized by using a prior art such as an element using an electro-optic effect, an element using mode conversion in a waveguide having periodical asymmetrical sectional shape, and an element using mode conversion by a hybrid super mode, and is designed so that mode conversion of 45° occurs in each of both the mode convertors.

In this case, the light wave propagating in the forward direction is brought into the same state of polarization as at the incident time since the nonreciprocal mode conversion of −45° and reciprocal mode conversion of 45° are cancelled out. Meanwhile, nonreciprocal mode conversion of +45° and reciprocal mode conversion of +45° occur to the light wave propagating in the reverse direction, and therefore, the state of polarization of the light wave rotates by 90° with respect to the incident time. Accordingly, by providing polarizers at an input terminal and an output terminal respectively, the converters can be caused to function as an optical isolator.

Further, for example, in the above described embodiment, the method in which the Si waveguide layer 1 is formed, and thereafter, the thin-film buffer layer 21 is formed on the Si waveguide layer 1 is described, but the present invention is not limited to such a method. For example, by the method as follows, an optical isolator of the structure in which the Si waveguide layer 1 and the magneto-optical material layer 3 are joined via the buffer layer 2 formed by the Si waveguide layer 1 side thin-film buffer layer and the magneto-optical material layer 3 side thin-film buffer layer can be also manufactured.

First, the thin-film buffer layer 21 is formed on the Si surface layer of the SOI substrate of the present invention by using the material X. As the forming method, the conventional thin-film forming techniques such as spin coat and spraying can be used.

Next, a waveguide pattern is transferred onto the thin-film buffer layer 21 by photolithography, the Si surface layer and the thin-film buffer layer 21 are processed by etching to form the Si waveguide layer 1 including the rib waveguide 4 (Si waveguide 4) in which the thin-film buffer layer 21 is stacked on the upper portion. For photolithography and etching, various prior arts can be used.

Next, the magneto-optical material layer 2 is deposited on the substrate corresponding to the magneto-optical material by crystal growth. For example, when magnetic garnet is used as a magneto-optical material, a flat magnetic garnet layer 2 can be deposited on the single crystal substrate formed from garnet by liquid phase epitaxy.

Next, the thin-film buffer layer 22 is formed on the magneto-optical material layer 3 by using the material X. As the forming method, the conventional thin-film forming techniques such as spin coat and spraying can be used.

Depositing the magneto-optical material layer 3 and forming the thin-film buffer layer 22 may be performed before forming the Si waveguide layer 1 and forming the thin-film buffer layer 21.

Next, when the thin-film buffer layer 21 stacked on the upper portion of the rib waveguide 4 and the thin-film buffer layer 22 are joined (bonded) in the placement where the light propagating in the rib waveguide 4 can be caused to generate a nonreciprocal phase change by the magneto-optical material layer 3, in concrete, in the placement where the magneto-optical material layer 3 corresponds to the entire rib waveguide 4, heat treatment (for example, 800° C. to 900° C.) may be performed or pressurization may be performed. Thereby, the buffer layer 2 is formed by the thin-film buffer layer 21 stacked on the upper portion of the rib waveguide 4 and the thin-film buffer layer 22.

As in the above descried embodiment, the magneto-optical material layer 3 is magnetized so as to cause the light propagating in the rib waveguide 4 to generate nonreciprocal phase change. For this purpose, magnetizing the magneto-optical material layer 3 in the vertical direction with respect to the propagating direction of the light in the rib waveguide 4 by providing the magnetic field applying unit 5 on the magneto-optical material layer 3, for example, may be carried out before or after joining.

FIG. 6 shows a partial sectional view of an optical isolator manufactured by the method shown in the above described modified example. When compared with the structure shown in FIG. 2, the optical isolator of FIG. 6 differs in the point that due to the difference in the sequence of forming the thin-film buffer layer 21, the surface where the rib waveguide 4 is not formed, of the Si waveguide layer 1 is exposed (the thin-film buffer layer 21 is not formed).

BRIEF DESCRIPTION OF THE DRAWINGS

FIG. 3 is a view schematically showing a rib waveguide 4;

FIG. 4 is a diagram showing the relationship of an amount of a nonreciprocal phase shift effect and thickness of a buffer layer 2 with respect to a refractive index of the buffer layer 2;

DESCRIPTION OF SYMBOLS

Figure 1:
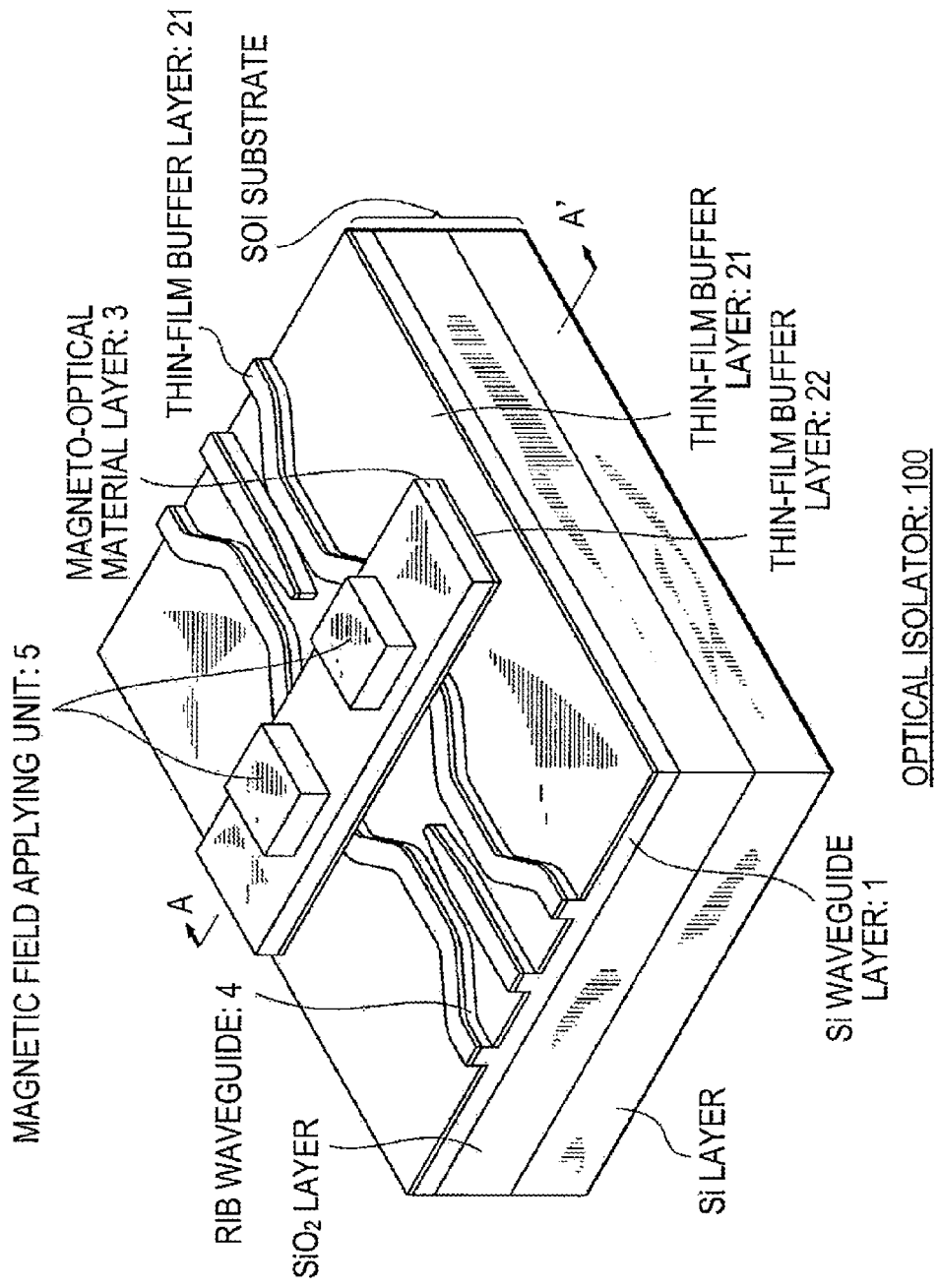
FIG. 1 is a view showing a structure of an optical isolator 100 according to an embodiment of the present invention.
Figure 2:
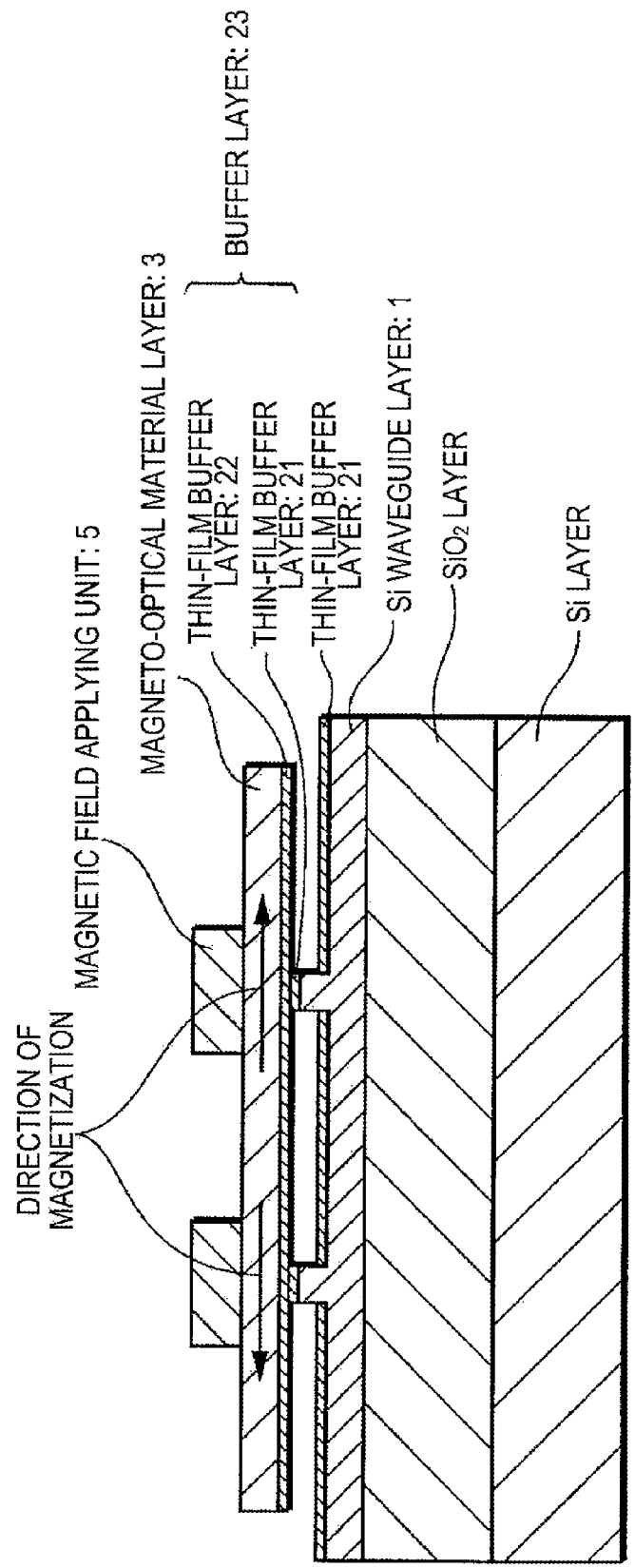
FIG. 2 is a partial sectional view of the optical isolator shown in FIG. 1.
Figure 5A:
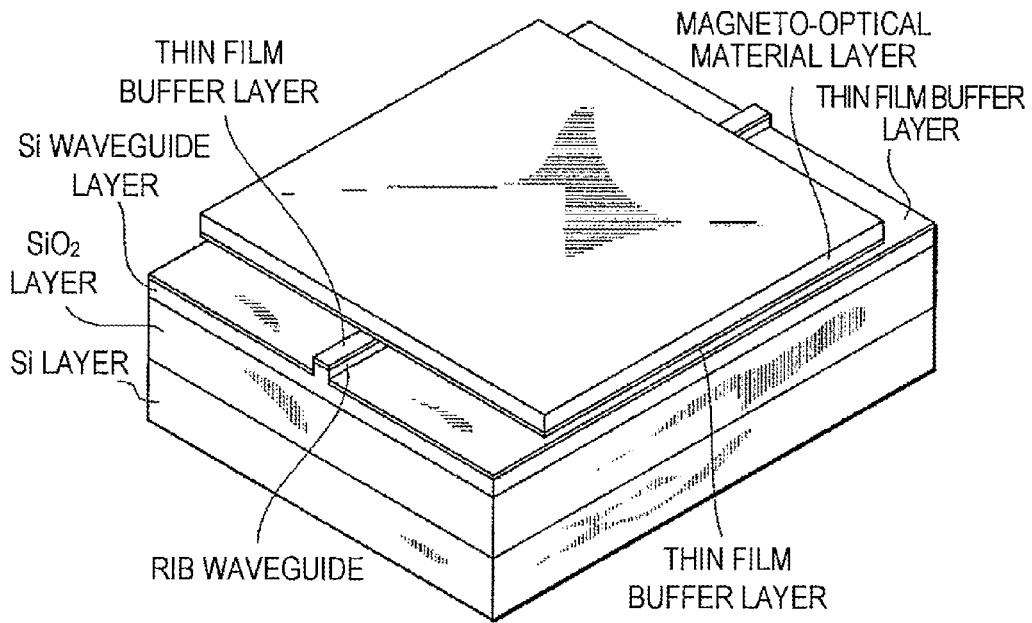
FIGS. 5A and 5B are views explaining an optical isolator of a modified example.
Figure 5B:
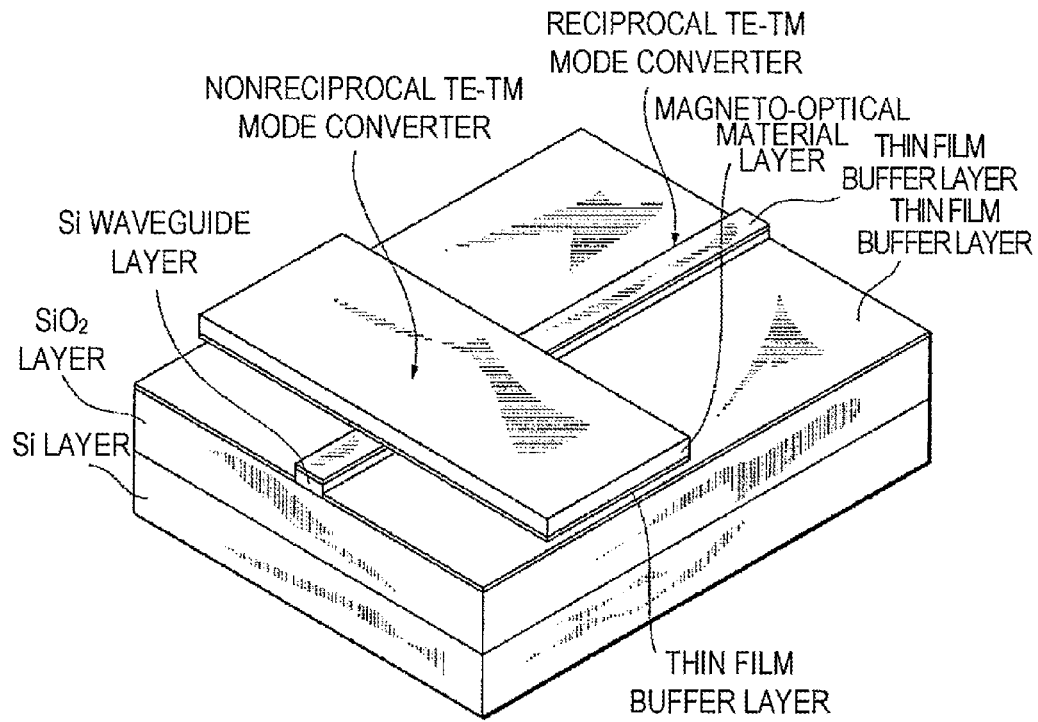
Figure 6:
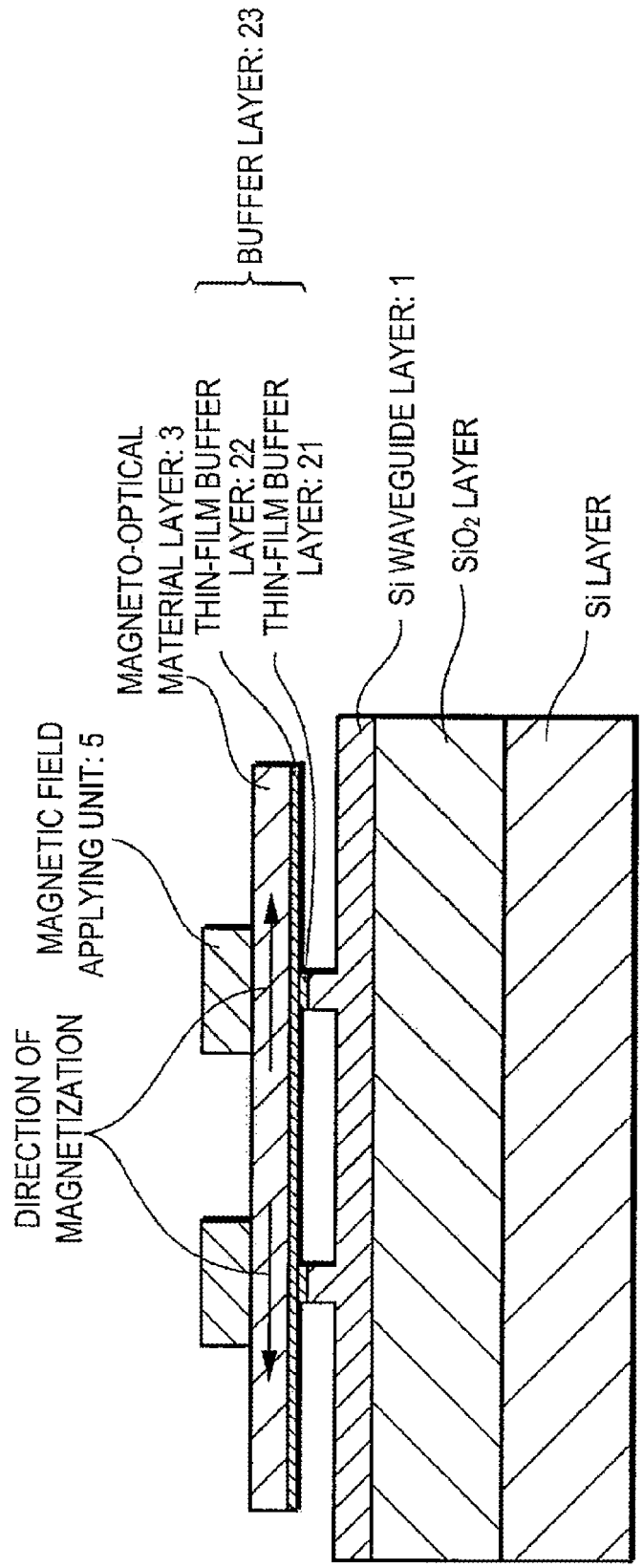
FIG. 6 is a partial sectional view of the optical isolator manufactured by a method shown in the modified example.

1 Si WAVEGUIDE LAYER; 2 BUFFER LAYER; 3 MAGNETO-OPTICAL MATERIAL LAYER; 4 RIB WAVEGUIDE; 5 MAGNETIC FIELD APPLYING UNIT; 11, 12, 13, 14 PORT; 21, 22 WAVEGUIDE

The invention claimed is:

1. A method for forming an optical nonreciprocal element, the method comprising:
   forming a first thin-film buffer layer on a silicon (Si) layer of a silicon-on-insulator (SOI) substrate;
   etching the first thin-film buffer layer and the Si layer to form a waveguide;
   forming a second thin-film buffer layer on a magneto-optical material layer deposited on a second substrate using a same material as that of the first thin-film buffer layer; and bonding the first thin-film buffer layer and the second thin-film buffer layer in a placement such that a light propagating in the waveguide can be caused to generate a nonreciprocal phase change by the magneto-optical material layer.

2. A method for manufacturing an optical nonreciprocal element, the method comprising:
   forming a first thin-film buffer layer on a silicon (Si) layer of a silicon-on-insulator (SOI) substrate;
   processing the Si layer and the first thin-film buffer layer to form an Si waveguide, wherein the first thin-film buffer layer is stacked on an upper portion of the Si waveguide;
   forming a second thin-film buffer layer on a magneto-optical material layer deposited on a second substrate using a same material as that of the first thin-film butler layer; and
   bonding the first thin-film buffer layer stacked on the upper portion of the Si waveguide, and the second thin-film buffer layer in a placement such that a light propagating in the waveguide can be caused to generate a nonreciprocal phase change by the magneto-optical material layer.

3. The method for manufacturing an optical nonreciprocal element according to claim 1, wherein the material forming the first thin-film buffer layer and the second thin-film buffer layer comprises a material having a refraction index which is 2.8 or higher, and lower than a refraction index of an Si waveguide layer.

4. The method for manufacturing an optical nonreciprocal element according to claim 1, further comprising magnetizing the magneto-optical material layer in a vertical direction with respect to a propagating direction of the light in the waveguide.

5. The method for manufacturing an optical nonreciprocal element according to claim 1, wherein the forming the first thin-film buffer layer, and the forming the second thin-film buffer layer are carried out so that a total of a thickness of the first thin-film buffer layer and a thickness of the second thin-film buffer layer is about 20 nanometers or less.

6. The method for manufacturing an optical nonreciprocal element according to claim 1, wherein the forming the second thin-film buffer layer comprises forming the second thin-film buffer layer on a magnetic garnet layer deposited on the second substrate.

7. The method for manufacturing an optical nonreciprocal element according to claim 1, wherein the magneto-optical material layer includes a first portion and a second portion, wherein the first portion is magnetized in a first direction, and wherein the second portion is magnetized in a second direction opposite the first direction.

8. The method for manufacturing an optical nonreciprocal element according to claim 1, wherein the magneto-optical material layer is formed along the entire waveguide.

9. The method for manufacturing an optical nonreciprocal element according to claim 1, further comprising forming a magnetic field applying unit in relation to the magneto-optical material layer, wherein the magnetic field applying unit is configured to apply a magnetic field to align a direction of magnetization of the magneto-optical material layer.

10. The method for manufacturing an optical nonreciprocal element according to claim 1, wherein the magneto-optical material layer comprises a magnetic garnet material.

11. The method for manufacturing an optical nonreciprocal element according to claim 1, further comprising depositing the magneto-optical material layer on the second substrate by crystal growth.

12. The method for manufacturing an optical nonreciprocal element according to claim 2, wherein the material forming the first thin-film buffer layer and the second thin-film buffer layer comprises a material having a refraction index of 2.8 or higher, and lower than a refraction index of an Si waveguide layer.

13. The method for manufacturing an optical nonreciprocal element according to claim 2, further comprising magnetizing the magneto-optical material layer in a vertical direction with respect to a propagating direction of the light in the waveguide.

14. The method for manufacturing an optical nonreciprocal element according to claim 2, wherein the forming the first thin-film buffer layer, and the forming the second thin-film buffer layer are carried out so that a total of a thickness of the first thin-film buffer layer and a thickness of the second thin-film buffer layer is about 20 nanometers or less.

15. The method for manufacturing an optical nonreciprocal element according to claim 2, wherein the forming the second thin-film buffer layer comprises forming the second thin-film buffer layer on a magnetic garnet layer deposited on the second substrate.

16. The method for manufacturing an optical nonreciprocal element according to claim 2, wherein the magneto-optical material layer includes a first portion and a second portion, wherein the first portion is magnetized in a first direction, and wherein the second portion is magnetized in a second direction opposite the first direction.

17. The method for manufacturing an optical nonreciprocal element according to claim 2, wherein the magneto-optical material layer is formed along the entire Si waveguide.

18. The method for manufacturing an optical nonreciprocal element according to claim 2, further comprising forming a magnetic field applying unit in relation to the magneto-optical material layer, wherein the magnetic field applying unit is configured to apply a magnetic field to align a direction of magnetization of the magneto-optical material layer.

19. The method for manufacturing an optical nonreciprocal element according to claim 2, wherein the magneto-optical material layer comprises a magnetic garnet material.

20. The method for manufacturing an optical nonreciprocal element according to claim 2, further comprising depositing the magneto-optical material layer on the second substrate by crystal growth.

* * * * *

UNITED STATES PATENT AND TRADEMARK OFFICE
CERTIFICATE OF CORRECTION

PATENT NO. : 8,335,407 B2
APPLICATION NO. : 12/665635
DATED : December 18, 2012
INVENTOR(S) : Yokoi It is certified that error appears in the above-identified patent and that said Letters Patent is hereby corrected as shown below:

On the Face Page, in Field (56), under "FOREIGN PATENT DOCUMENTS", in Column 2, Line 8, delete "JP 2006-349778 12/2006".

In Column 1, Line 10, delete "incorporate" and insert -- incorporated --, therefor.

In Column 1, Line 32, delete "17-22" and insert -- 17-22. --, therefor.

In Column 3, Line 50, delete "Mach-Zender" and insert -- Mach-Zehnder --, therefor.

In Column 8, Line 17, delete "descried" and insert -- described --, therefor.

In Column 9, Line 15, in Claim 2, delete "butler" and insert -- buffer --, therefor.

Signed and Sealed this
Ninth Day of April, 2013

Teresa Stanek Rea
*Acting Director of the United States Patent and Trademark Office*